F. C. SCHERPING.
TRUCK.
APPLICATION FILED JUNE 8, 1908.

903,890.

Patented Nov. 17, 1908.

WITNESSES:
J. Ray Abbey

INVENTOR
Frank C. Scherping
BY
ATTORNEY

UNITED STATES PATENT OFFICE.

FRANK C. SCHERPING, OF SAGINAW, MICHIGAN.

TRUCK.

No. 903,890.  Specification of Letters Patent.  Patented Nov. 17, 1908.

Application filed June 8, 1908. Serial No. 437,388.

*To all whom it may concern:*

Be it known that I, FRANK C. SCHERPING, a citizen of the United States, residing at Saginaw, in the county of Saginaw and State of Michigan, have invented certain new and useful Improvements in Trucks; and I do hereby declare the following to be a full, clear, and exact description of the invention, such as will enable others skilled in the art to which it appertains to make and use the same.

My invention relates to trucks and more particularly to that class of trucks designed for moving heavy machinery or other loads from place to place.

One object of my invention is to provide a low truck which has a minimum of space between it and the floor or ground, whereby to reduce the height to which a heavy machine or box must be lifted in order to insert the truck therebeneath.

Another object is the provision of a tilting truck supported upon two separate rollers set intermediate its ends, the truck having one end beveled at such an angle as to frictionally engage the floor throughout its length when the truck is tilted.

A further object is the provision of a broad flat truck whose upper surface is plane, even and smooth.

To these ends therefore, my invention consists in certain novel features and combinations such as will be more fully described hereinafter and particularly pointed out in the claims.

Figure 1:
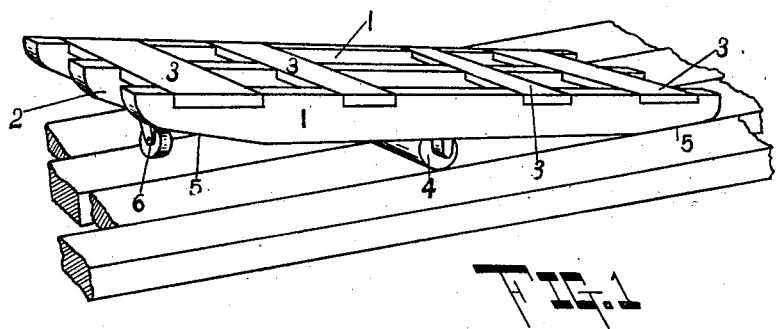
Figure 2:
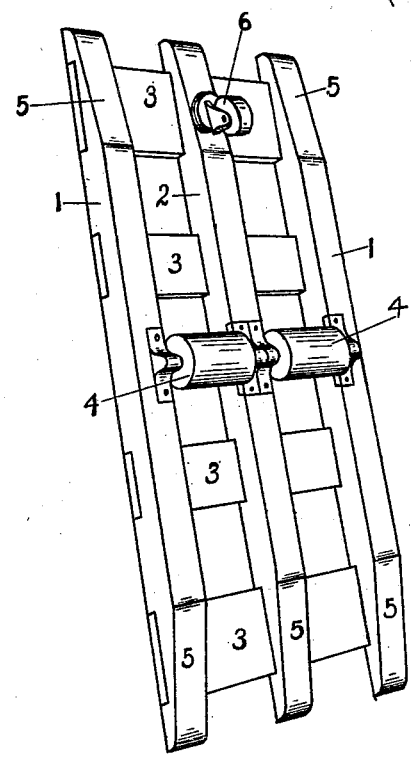

In the accompanying drawings, Figure 1 is a perspective view showing my invention in tilted position ready to take on a load and Fig. 2 is a similar view showing the bottom of the truck.

It is customary when a heavy piece of machinery or other article is to be moved, to mount the machine on planks and provide a number of pipe lengths or rolls which are inserted beneath the planks, the machine and planks being pushed along and the rolls as they are left behind, picked up and placed in the path of travel of the machine. This is not only a very slow and laborious proceeding but it also mars the floor surface, and requires the services of several men because of the frictional contact of the several rolls and the floor. Furthermore, it is a rather difficult matter to make a turn or corner by this prehistoric method of transportation, when moving a machine weighing four tons for instance. To avoid the many disadvantages inherent to this method of transportation, I have devised a truck or lorry so called, comprising a plurality of longitudinally extending beams arranged parallel with each other as shown. The beams 1, 1 constitute the sides of the truck and the beam 2, what I shall term the backbone thereof.

The upper faces of the longitudinally extending beams are mortised to receive the cross bars 3, 3, the upper faces of which lie flush with the upper faces of the beams so that the surface of the truck is flat and even. Preferably I make the truck of hard wood, the flat upper surface being smooth so as to permit heavy articles to slide off by gravity when the truck is tilted. The beams and cross-pieces constitute the body portion of the truck.

I journal a pair of rolls 4, 4, in alinement with each other, on the under faces of and between the sides and backbone of the truck respectively. These rolls are separate from each other and are located intermediate the ends of the truck between the two adjacent cross-pieces, so that the peripheries of the rolls project above the plane of the bottom of the truck. By using but two rolls I can turn the truck easily and without loss of time, the truck being balanced relative to the rolls and as the truck is turned, the two rolls rotate in opposite directions.

The under faces of the sides and backbone are beveled or cut away at their ends as at 5 and the angle of such bevel is so arranged that when the truck is tilted to receiving position, as in Fig. 1 the full bevel rests squarely on the floor or ground, forming what I shall call a "dead" end. The advantages of such dead end combined with the smooth upper surface is that one end of a heavy machine can be raised sufficiently to permit the tilted dead end to be inserted therebeneath whereupon the machine or other article can be pushed onto the truck because its weight is always bearing down upon the beveled faces which rest upon the floor and because of the frictional contact prevent the truck from sliding forward as the machine is pushed onto it.

A single, swiveled caster 6 is secured to the beveled face of the centrally located backbone at one end. Such caster is broad so as to ride over inequalities in the floor or ground and is located on the beveled face in order to retain the truck as close to the ground as possible.

In operation, the load is raised sufficiently to permit the dead end to be inserted thereunder after which the load is lowered upon the truck and pushed further onto the truck until the latter " balances." Or if preferred, as soon as the load is sufficiently resting on the truck a man or two can jump onto the front or caster end of the truck until the load is balanced, whereupon the truck can be pushed with the load to any desired point.

The saving in time and labor accomplished by this truck is enormous, and its use is not limited to moving heavy machinery but may be used in freight and passenger depots, or wherever it is necessary to transport heavy articles.

Having thus fully disclosed my invention, what I claim as new is:—

1. A tilting truck comprising a body portion having a flat smooth upper surface, a pair of alined rolls journaled on the under face of the body portion, the body portion being balanced on the rolls, the under face at one end being beveled at an angle so that when the truck is tilted, the beveled face will lie horizontal with and engage the support, the opposite end of the under face of the body portion being beveled and a caster secured to the last named beveled surface.

2. A tilting truck comprising a body portion composed of longitudinally extending sides and a central member parallel therewith, cross-pieces spaced apart from each other and mortised into the upper faces of the longitudinally extending sides and central member, to provide a smooth flat upper surface, a roll, the ends of which are journaled in one side and the central member respectively, a second roll, the ends of which are similarly journaled in the remaining side and the central member, the rolls lying in alinement with each other, the under faces of the sides and central member at one end being beveled at such an angle that when the truck is tilted the beveled surfaces will rest squarely on the floor, the under face of the central member at its opposite end being beveled and a caster secured to the last named beveled face.

3. A tilting truck comprising a body portion having a smooth flat, upper surface, a single pair of alined rolls journaled on the under face of the truck intermediate its ends, the under face at one end of the truck being beveled, to engage the floor surface, and a caster secured to the opposite end of the truck, the caster and rolls located in triangular relation with each other.

In testimony whereof, I affix my signature in presence of two witnesses.

FRANK C. SCHERPING.

Witnesses:
    Mrs. F. C. SCHERPING,
    RALPH S. WARFIELD.